US011860500B2

(12) United States Patent
Liebl et al.

(10) Patent No.: US 11,860,500 B2
(45) Date of Patent: Jan. 2, 2024

(54) COMMON DATABASE FOR SUPERVISORY CONTROL AND ON-SITE COMMISSIONING OF AN ELECTRICALLY SWITCHABLE GLASS SYSTEM

(71) Applicant: SAGE Electrochromics, Inc., Faribault, MN (US)

(72) Inventors: Troy Liebl, Owatonna, MN (US); David Best, Elysian, MN (US); Sean Kioski, Burnsville, MN (US)

(73) Assignee: SAGE Electrochromics, Inc., Faribault, MN (US)

( * ) Notice: Subject to any disclaimer, the term of this patent is extended or adjusted under 35 U.S.C. 154(b) by 716 days.

(21) Appl. No.: 17/067,575

(22) Filed: Oct. 9, 2020

(65) Prior Publication Data

US 2021/0109417 A1 Apr. 15, 2021

Related U.S. Application Data

(60) Provisional application No. 63/101,232, filed on Oct. 15, 2019.

(51) Int. Cl.
*G02F 1/163* (2006.01)
*G06F 16/25* (2019.01)
*G06F 16/23* (2019.01)
*G06F 16/21* (2019.01)

(52) U.S. Cl.
CPC ............ *G02F 1/163* (2013.01); *G06F 16/219* (2019.01); *G06F 16/23* (2019.01); *G06F 16/25* (2019.01)

(58) Field of Classification Search
CPC ...................................................... G02F 1/163
See application file for complete search history.

(56) References Cited

U.S. PATENT DOCUMENTS

| 7,464,092 | B2 * | 12/2008 | Lee ......................... G06F 16/20 |
| 9,360,731 | B2 | 7/2016 | Berman et al. |
| 10,365,531 | B2 | 6/2019 | Shrivastava et al. |
| 2013/0242370 | A1 | 9/2013 | Wang |
| 2014/0337988 | A1 | 11/2014 | Gandhi et al. |

(Continued)

FOREIGN PATENT DOCUMENTS

| CN | 108427232 A | 8/2018 |
| JP | 2016516921 A | 6/2016 |

(Continued)

OTHER PUBLICATIONS

Office Action dated Sep. 12, 2022 in Indian Patent Application No. 202227021880, SAGE Electrochromics, Inc., pp. 1-6.

(Continued)

*Primary Examiner* — Joseph P Martinez
(74) *Attorney, Agent, or Firm* — Alexander A. Knapp; Kowert, Hood, Munyon, Rankin & Goetzel, P.C.

(57) ABSTRACT

An integrated computerized control system is capable of automating phases of electrochromic glass configuration, commissioning and control using a database synchronized between a provider side (e.g. manufacturer) and a customer side (e.g. installation location). The control system may support an on-site commissioning process that better ensures that each particular piece of electrochromic glass is correctly matched to glass-specific information used to configure a respective controller to control the particular piece of glass having particular characteristics.

20 Claims, 14 Drawing Sheets

(56) References Cited

U.S. PATENT DOCUMENTS

| | | |
|---|---|---|
| 2016/0154290 A1 | 6/2016 | Brown et al. |
| 2016/0328367 A1 | 11/2016 | Creekbaum et al. |
| 2017/0075323 A1 | 3/2017 | Shrivastava |
| 2018/0307114 A1 | 10/2018 | Brown et al. |
| 2019/0243206 A1 | 8/2019 | Brown et al. |
| 2019/0257151 A1 | 8/2019 | Fasi et al. |

FOREIGN PATENT DOCUMENTS

| | | |
|---|---|---|
| JP | 2021523400 A | 9/2021 |
| KR | 100722008 B1 | 5/2007 |
| KR | 1020190044812 | 5/2019 |
| KR | 20190077583 | 7/2019 |
| TW | 201907213 | 2/2019 |
| WO | 2014130471 A1 | 8/2014 |
| WO | 2017155833 | 9/2017 |
| WO | 2018098089 | 5/2018 |
| WO | 2019213441 A1 | 11/2019 |

OTHER PUBLICATIONS

International Search Report and Written Opinion from PCT/US2020/055745, dated Feb. 10, 2021, pp. 1-9.

Office Action dated Jun. 2, 2023 in Japanese Patent Application No. 2022-522779, Sage Electrochromics, Inc., pp. 1-7 (including translation).

Myunghwan Oh, et al., "Deducing the Optimal Control Method for Electrochromic Triple Glazing through an Integrated Evaluation of Building Energy and Daylight Performance", Retrieved from www.mdpi.com/journal/energies, Energies 2018, 11, 2205; doi:10.3390/en11092205, pp. 22.

SageGlass, "CE Control System—User's Manual & Installation Guide", Saint-Gobain, Retrieved from https://sageglass.com/sites/default/files/sageglass-control-system-installation-guide_scs-037.pdf, 2019, pp. 1-36.

\* cited by examiner

Add New Glass to Project                                                                 X Reference:  [ IGU 102 ]          Shape:       [ Shape 0  ☐ 0  ⌄ ]

Quantity:   [ 1 ]                Glass Type:  [ Normal  ▨▨  ⌄ ]

Bus bars:   [ 2 ]

Length    Width
IGU Dimensions (mm):  |  A  | x |  B  |
Pane 1 Dimensions (mm): | C | x |  D  |

IGU Dimensions are the device dimensions. Pane dimensions are film dimensions

[ Fill Pane Dimensions ]                                          [ Create ]

*FIG. 6*

Add Glass Elevation to Project

Elevation
Elevation Name

Width
0  ft. ∨  0  in. ∨

Height
0  ft. ∨  0  in. ∨

Direction
0°

Background Image
Choose File...
Suggested Size: 1280x800

OK
Cancel

FIG. 7

Manage Glass for Project

| Ref ⇩ | Quantity ⇩ | Length (mm) ⇩ | Width (mm) ⇩ | Shape ⇩ | Glass Type ⇩ | | |
|---|---|---|---|---|---|---|---|
| IGU 102 | 2 | A | B | 0 | | Remove | Edit |
| IGU 104 | 1 | X | Y | 0 | | Remove | Edit |
| IGU 106 | 1 | T | U | 0 | | Remove | Edit |
| IGU 108 | 2 | C | D | 0 | | Remove | Edit |
| IGU 110 | 2 | E | F | 0 | | Remove | Edit |

[Import from Vendor] [Add New] [OK]

FIG. 8

| Network Device Discovery | | | | X |
|---|---|---|---|---|
| Filter... ⌄ | | | | ○ Start |
| Name | Serial Number | Network IP | New IP | Status |
| IGU Controller 1 | 00000020 | | 172.20.0.103 | ? |
| IGU Controller 2 | 00000021 | | 172.20.0.120 | ? |
| three 360 Degree Sensor | 00000021 | | 172.20.0.106 | ? |
| 1 Wall Touch Panel | 00000050 | | 172.20.0.110 | ? |
| two Facade Sensor | 00000050 | | 172.20.0.107 | ? |
| one Facade Sensor | 00000060 | | 172.20.0.105 | ? |
| 123 Wall Touch Panel | 00000070 | | 172.20.0.100 | ? |
| North Side Wall Touch Panel | 00000080 | | 172.20.0.109 | ? |
| West Side Wall Touch Panel | 00000095 | | 172.20.0.111 | ? |
| IGU Controller Control Panel | 00000301 | 172.20.0.130 | 172.20.0.130 | ✓ |
| 2 Wall Touch Panel | 45786312 | | 172.20.0.108 | ? |
| | | | | Assign |

*FIG. 10*

COMMON DATABASE FOR SUPERVISORY CONTROL AND ON-SITE COMMISSIONING OF AN ELECTRICALLY SWITCHABLE GLASS SYSTEM

PRIORITY INFORMATION

This application claims benefit of priority to U.S. Provisional Patent Application No. 63/101,232, filed on Oct. 15, 2019 titled "COMMON DATABASE FOR SUPERVISORY CONTROL AND ON-SITE COMMISSIONING OF AN ELECTRICALLY SWITCHABLE GLASS SYSTEM," which is hereby incorporated by reference herein in its entirety.

BACKGROUND

Electrically switchable glass may include a type of glass or glazing for which light transmission properties of the glass or glazing are altered when electrical power (e.g. voltage/current) is applied to the electrically switchable glass. For example, electrically-switchable glass may include suspended particles that are organized or that revert to a disorganized state based on the application of electrical power. Also, electrically-switchable glass may include electrochromic materials that change in opacity when electrical power is applied. Some electrochromic materials may maintain a level of opacity resulting from the application of an electrical voltage, even after the electrical voltage is no longer applied. Also, electrically-switchable glass may include polymer dispersed liquid crystals that may be ordered in an aligned configuration or a non-aligned configuration which causes light to be allowed or impeded from passing through the electrically switchable glass, wherein the alignment of the liquid crystals is controlled by applying electrical power to the material.

Controllers may control electrically switchable glass by controlling a voltage or current applied to the electrically switchable glass. In many systems different types and sizes of electrically-switchable glass may be used, and the different types and sizes of electrically switchable glass may require different levels of current and/or voltage to achieve similar levels of opacity. Thus in systems comprising various sizes and types of electrically-switchable glass, configuration and control parameters for respective controllers that control different pieces of electrically switchable glass may need to take into account differences in characteristics of the electrically switchable glass (e.g. different required voltage levels or currents) to achieve particular opacity levels.

BRIEF DESCRIPTION OF THE DRAWINGS

FIG. 6 illustrates an example window of a user interface of a supervisory control system for entering characteristics of an electrochromic glass unit to a project, according to some embodiments.

FIG. 7 illustrates an example window of a user interface of a supervisory control system for entering elevations for a project, according to some embodiments.

FIG. 8 illustrates an example window of a user interface of a supervisory control system for managing electrochromic glass units for a project, according to some embodiments.

FIG. 10 illustrates an example window of a user interface of a supervisory control system for a controller discovery process, according to some embodiments.

Figure 1:
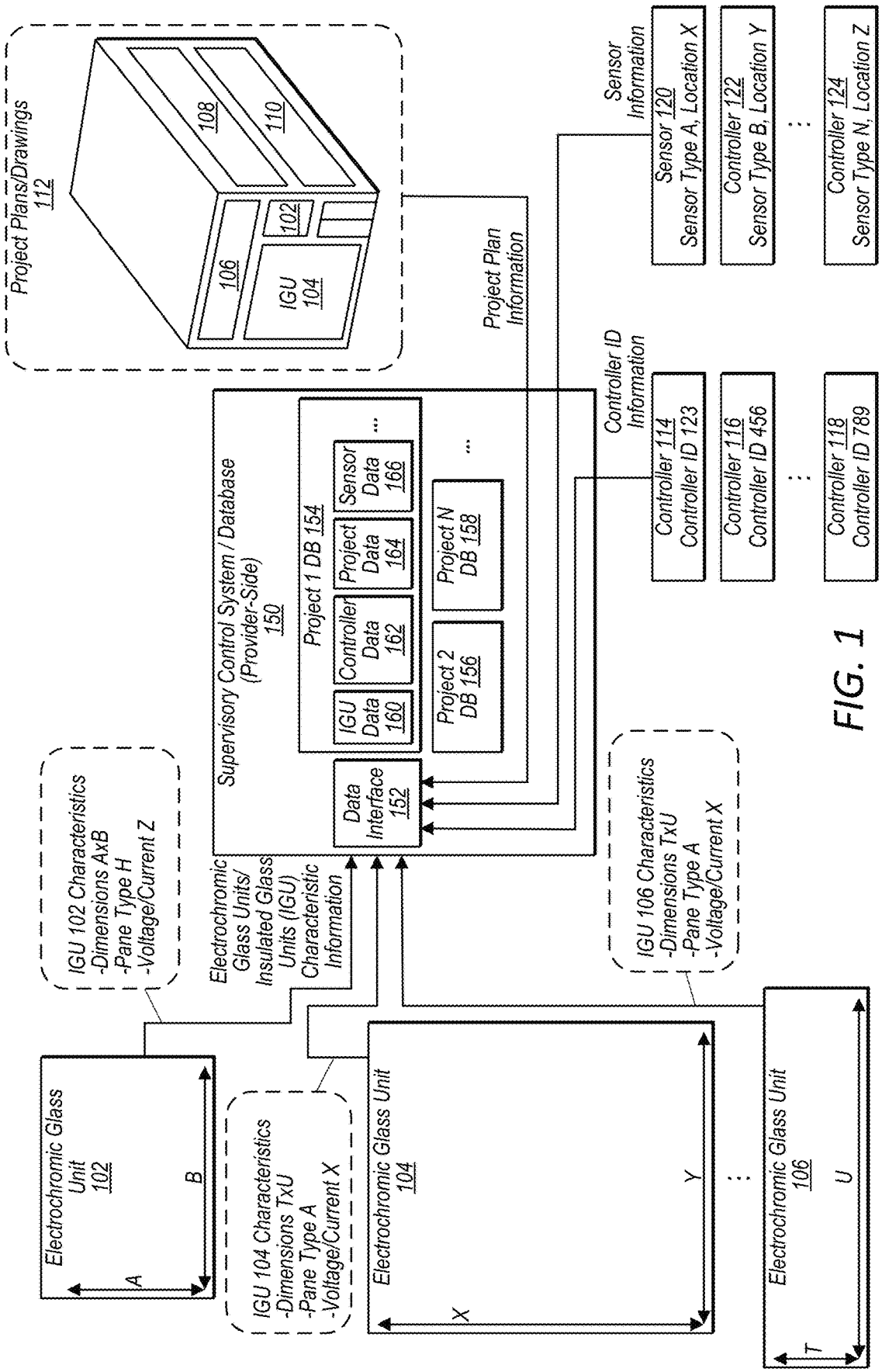
FIG. 1 illustrates a provider-side supervisory control system and database that is being pre-populated with data-sets for an electrochromic glass system to be installed at a customer-site, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of supervisory control systems and associated databases for electrochromic glass systems are described herein. In some embodiments, a system, for example at a manufacturing site for electrochromic glass, includes one or more computing devices configured to implement one or more data input interfaces to one or more project databases, a mapping engine, and a project database export interface. The one or more data input interfaces are configured to store, to the project database, electrochromic glass system data for an electrochromic glass system to be installed at a customer-site. The mapping engine is configured to map, based on the electrochromic glass system data, controller identifiers to electrochromic glass units to be installed at the customer-site, wherein the electrochromic glass units are to be controlled by controllers having the respective controller identifiers. Also, the project database export interface is configured to export a current version of the database to be accessible by a supervisory control system at the customer-site, including a current mapping between the respective ones of the controllers to be installed at the customer-site and the respective ones of the electrochromic glass units to be installed at the customer-site. Furthermore, the one or more data input interfaces are configured to receive updated electrochromic glass system data for the electrochromic glass system and automatically update the database to reflect the updated electrochromic glass system data. Also, the mapping engine is configured to automatically update the current mapping based on a current set of information stored in the database for the electrochromic glass system. Additionally, the project database export interface is configured to export an updated current version of the database for use by the supervisory control system at the customer-site, the updated current version of the database comprising the updated electrochromic glass system data and the updated mappings.

For example, in some embodiments, the one or more data input interfaces may include input interfaces to a supervisory control system implemented by a provider of electrochromic glass systems, such as a manufacturer. The provider-side supervisory control system may be configured to receive design updates for the electrochromic glass system prior to installation of the electrochromic glass system and automatically update the project database, mappings between controllers and electrochromic glass units, wiring diagrams, materials lists, etc. in accordance with the design updates. Also, in some embodiments, the one or more data input interfaces to the provider-side supervisory control system may be configured to receive an updated version of a project database that has been updated to match an as-built configuration of an electrochromic glass system installed at a customer-site. For example, a complimentary supervisory control system and database at the customer-site may update a project database to reflect an as-built configuration and the updated project database may be exported from the customer-site supervisory control system and database and received at a provider-side supervisory control system and database, wherein updates included in the project database reflecting the as-built configuration are merged into (or replace) a corresponding project database for the project stored by the provider, e.g. manufacturer.

In some embodiments, a secure network connection may be established between a provider-side supervisory control system and database and a customer-site-side supervisory control system and database, wherein updates between the databases are exchanged via the secure connection. Also, in some embodiments, a third-party cloud provider may store one or more versions of a project database and updates may be communicated to the third-party cloud provider. Also, in some embodiments, updates between a provider-side project database and a customer-site-side project database may be communicated by downloading a current copy of one of the databases (either provider-side or customer-site-side) to a portable storage device, such as a flash memory drive, hard drive, storage disk, etc. and transferring the updated version of the project database to either the customer-site-side or the provider-side database via the portable storage device, wherein a data input interface at the customer-site or provider is configured to couple with the portable storage device and import the updated version of the database into a version of the project database stored for the provider or a version of the project database stored at the customer-site.

In some embodiments, a system, such as at a customer-site, includes one or more computing devices configured to implement a supervisory control system for an electrochromic glass system installed or to be installed at the customer-site. The supervisory control system includes a database import interface, configured to import a pre-populated database for the electrochromic glass system, wherein the pre-populated database comprises respective mappings between respective controllers of the electrochromic glass system and respective electrochromic glass units of the electrochromic glass system. Also, the supervisory control system includes a controller configuration module configured to identify respective ones a plurality of controllers of the electrochromic glass system and automatically configure, at the customer-site, the respective ones of the installed controllers based on the respective characteristics of electrochromic glass units mapped to the respective controllers, wherein different ones of the electrochromic glass units have different characteristics. Furthermore, in some embodiments, the supervisory control system comprises a supervisory controller, configured to coordinate control of the respective controllers mapped to the respective electrochromic glass units. In some embodiments, one or more control algorithms for the supervisory controller are specified in the pre-populated databased imported via the database import interface.

In some embodiments, a computer-readable medium stores program instructions, that when executed on one or more processors, cause the one or more processors to discover controllers for electrochromic glass units connected to a network and provide, to respective ones of the controllers, configuration parameters for particularly configuring the respective controllers to control respective electrochromic glass units to which the respective controllers are coupled, wherein the configuration parameters are provided based on respective mappings between controller identifiers for the respective controllers and characteristics of the electrochromic glass units to which the controllers are mapped, wherein the characteristics are stored in a project database accessible to the one or more processors.

In some embodiments, there are at least three phases involved in configuring a supervisory control system for a set of electrochromic glass units, also referred to herein as insulated glass units or IGUs. First there is an up-front configuration phase, wherein IGUs are selected to be included in a project and where a layout for the IGUs on one or more facades, such as of a building, are determined. Often the up-front configuration phase is performed by a designer or other person working for or with a provider of the electrochromic glass units or IGUs, such as a manufacturer of the electrochromic glass units. Next a commissioning phase is performed, wherein the electrochromic glass units (e.g. IGUs) are installed at a customer site and coupled to respective local controllers for the electrochromic glass units (e.g. IGUs). Often a different set of personnel perform on-site installation than a group of personnel that performed the design as part of the up-front configuration. Finally, an ongoing operational control phase is performed to control the electrochromic glass units (e.g. IGUs) using a supervisory control system installed at the customer-site. The supervisory control system may coordinate control of a plurality of local controllers, each associated with a respective electrochromic glass unit (e.g. IGU). Because different ones of the electrochromic glass units (e.g. IGUs) have different sizes and have other varying characteristics, the local controllers may need to be specifically configured to control a particular electrochromic glass unit coupled to the particular controller.

For example, in some embodiments, controllers of an electrochromic glass system may control respective electrochromic glass units to any one of eight or more tint levels. However, due to the different characteristics between the different electrochromic glass units (e.g. IGUs), different voltages and current levels may need to be applied to the different electrochromic glass units (e.g. IGUs) to achieve similar tint levels. As an example, a first smaller IGU with a first set of characteristics may require X volts be applied to achieve a tint level 3, whereas another IGU with a different size and different characteristics may require Y volts be applied to achieve a tint level 3. Thus the controller for the smaller IGU may need to be configured to output X volts for tint level 3, whereas the other controller may need to be configured to output Y volts for tint level 3.

In previous systems, controllers for particular IGUs have been configured for the particular IGUs at a time of manufacturing and prior to delivery of an electrochromic glass system to a customer-site. For example, the controller associated with the smaller IGU may have been configured at the factory to output X volts for tint level 3, whereas the other controller may have been configured at the factory to output Y volts for tint level 3. However, in such arrangements, if a controller is coupled to a different IGU than it was configured for at the time of manufacturing, the controller may not properly control the IGU to one or more specified tint levels. For example, if the controller for the smaller IGU ended up being coupled at the customer-site to the larger IGU, the controller may not properly control the larger IGU to tint level 3 by applying X volts (e.g. the voltage for the smaller IGU). Also, a piece of glass of a given IGU may break and be replaced with another IGU having different characteristics. In systems wherein controller configurations are performed at a time of manufacture and prior to installation, any changes such as switching controllers and IGU panels or replacing a broken IGU panel with a replacement IGU panel with different characteristics, may require the controller to be sent back to the factory to be re-configured or may require extensive re-wiring to relocate controllers from IGUs to which they are currently attached and to re-attach the controllers to IGUs to which they were intended to be attached based on original mappings used to configure the controllers.

As can be seen, the at least three phases (e.g. up-front configuration, commissioning, and operational control) are tightly coupled in the sense that they must share data across the phases. For example, the mappings determined in the up-front configuration are used in commissioning, and these mappings and any changes made during commissioning are used for operational control. Previous systems have used separate databases/data organizational structures for each phase. However, this creates inefficiencies and opportunities for error when sharing data across phases. For example, previous systems have used a first application for up-front configuration and a separate application or process for commissioning, and yet a third system for operational control. The boundaries between these systems provide opportunities for data to be lost or improperly transferred or updated. Also, managing data flow across these boundaries is time-consuming and inefficient. For example, previously files were copied and/or manually updated between phases without a centralized authoritative view of the data across the phases.

In some embodiments, in order to streamline the manufacturing process, provide a centralized data authority across phases, and to reduce the impact of errors during installation (e.g. switching controllers and IGUs, broken IGUs, etc.), a supervisory control system and database may be implemented at a place of manufacture, e.g. a provider-side supervisory control system and database. The supervisory control system and database may be used to pre-populate a database of IGUs, controllers, sensors, etc. for a project. In some embodiments, the supervisory control system and database may implement a graphical user interface that enables a designer to graphically arrange IGUs, controllers, and sensors on one or more facades of a project (such as a wall of a building). In some embodiments, the supervisory control system and database on the provider-side may automatically generate mappings between controllers and IGUs. Also the supervisory control system and database may automatically generate wiring diagrams, installation diagrams, installation procedures, etc. based on a current view of a project as reflected in a current project database. In some embodiments, the supervisory control-system and database on the provider-side may automatically update a project database including determined mappings, parts lists, wiring diagrams, installation diagrams, installation procedures, etc. based on design changes provided to the supervisory control system and database. For example, a designer may change a size or location of an IGU and the supervisory control system may automatically update wiring diagrams, installation diagrams, installation procedures, etc. based on the updated design.

The supervisory control system and database may further include a project database export interface configured to export the latest version of the project database along with wiring diagrams, installation diagrams, installation procedures, etc. The exported project database may be pre-populated with IGU characteristic information, IGU layout information, controller layout information, sensor layout information, IGU to controller mappings, etc. The exported project database may be exported in a format compatible with a customer-side supervisory control system, wherein the customer-side supervisory control system adopts the pre-populated project database as a local database used by the customer-side supervisory control system to locally configure particular controllers based on characteristics of IGUs associated with the local controllers.

For example, the local controllers installed at the customer-site may be coupled to a local network at the customer-site, such as an Ethernet network, and may advertise to, or be detected by, the supervisory control system at the customer-site. Furthermore, the local controllers may advertise or otherwise communicate a controller ID associated with the respective local controllers to the supervisory control system at the customer-site. The supervisory control system may utilize mappings stored in the pre-populated project database along with characteristics of the IGUs stored in the pre-populated project database to determine how to particularly configure the respective local controllers. For example, the supervisory control system may determine that a first local controller has a controller ID of 123 and may determine based on a mapping that controller 123 is mapped to IGU 106. Furthermore, the project database may store characteristic information for IGU 106 that may be used to determine voltage/current levels to be applied to IGU 106 to achieve particular tint levels. The supervisory control system may further configure the controller 123 to output voltages based on the particular characteristics of IGU 106 to which the controller 123 is attached.

Because controllers are particularly configured at the customer-site based on an exported pre-populated project database, changes entered into the database may be automatically accounted for in the configuration of the controllers. For example, during installation a commissioning team member may determine that controllers were switched when being coupled to a set of IGUs. In such a scenario, instead of having to remove the controllers and re-install the controllers on the originally intended IGUs, the project database mappings may simply be updated. This may then cause the correct IGU characteristics to be associated with each of the controllers, such that the controllers are particularly configured using characteristics of the as-built IGUs.

Furthermore, the updated project database may be exported from the customer-site supervisory control system and database and imported or merged back into the project database on the provider-side. Additionally, importing the updated project database from the customer-site may cause the provider-side database to be automatically updated. Furthermore, IGU layout diagrams, IGUs to controller mappings, wiring diagrams, installation diagrams, installation procedures, etc. at the provider-side database may be automatically updated to reflect the as-built configuration in the field, e.g. at the customer-site. This may be done without requiring a human technician to manually enter the as-built changes at the provider-side project database. Furthermore, future upgrades or design changes may be designed on the provider-side, wherein a current version of the project database at the provider-side is updated as part of the upgrade or re-design. Additionally, the updated project database at the provider-side that includes changes as part of the upgrade project or re-design may further be exported back to the customer-side database when it is time to execute the upgrade project or re-design.

In some embodiments, in order to configure controllers at a customer-site a supervisory control system at the customer-site may execute a discovery process to discover controllers and/or other devices, such as sensors, connected to a local Ethernet network at the customer-site. In some embodiments, each device, such as a controller may be delivered to a customer-site with a pre-installed dynamic host configuration protocol (DHCP) module. The DHCP module may advertise a dynamic Internet Protocol (IP) address over the Ethernet network to the supervisory control system connected to the Ethernet network. The supervisory control system may then initiate or receive communications with the device (e.g. controller) using the dynamic IP address and determine a device ID of the device, such as a controller ID for a controller. The supervisory control system may further determine that the device ID (e.g. controller ID) is included in a pre-populated project database for the electrochromic glass system and may further assign a static IP address to the device (e.g. controller) and add the static IP address for the device (e.g. controller) to the project database for the electrochromic glass system. The supervisory control system at the customer-site may currently or subsequently perform a similar process for other devices, such as controllers, of the electrochromic glass system installed at the customer-site.

In some embodiments, the supervisory control system may then send configuration information to respective ones of the controllers identified during the discovery process to configure the respective controllers identified via the discovery process. The configuration information may be determined based on mappings between the respective controllers and IGUs, wherein the mappings are included in the pre-populated project database. Furthermore the configuration information may be determined based on characteristics of the IGUs mapped to the respective controllers, wherein the characteristics are included in the project database.

Also, the mappings or IGU characteristics may be updated in the project database, for example via a graphical interface at the customer-site or via importation of an updated version of the project database from the provider-side project database. The supervisory control system may then automatically re-configure the controllers for the IGUs as necessary based on updated mappings and/or characteristics of the IGUs.

In addition to controller to IGU mappings, in some embodiments a project database may include other mappings, such as: mappings for daylight and glare algorithms, zone mappings for zone based control, scene creation mappings, wherein a set of IGUs are controlled in a coordinated fashion to create a scene, such as a company logo, etc. All of these mappings may depend on knowing where IGUs and associated controllers are positioned on a facade, such as a wall of a building. Also, in some embodiments a supervisory control system and database may automatically update these various types of mappings based on updates received either via a graphical interface, other user interface, or database import. For example, a supervisory control system at a provider-side-site may update such mappings in response to receiving as-built information about an electrochromic glass system via an updated database import interface, as an example.

Example Provider-Side Supervisory Control System and Database

Figure 2:
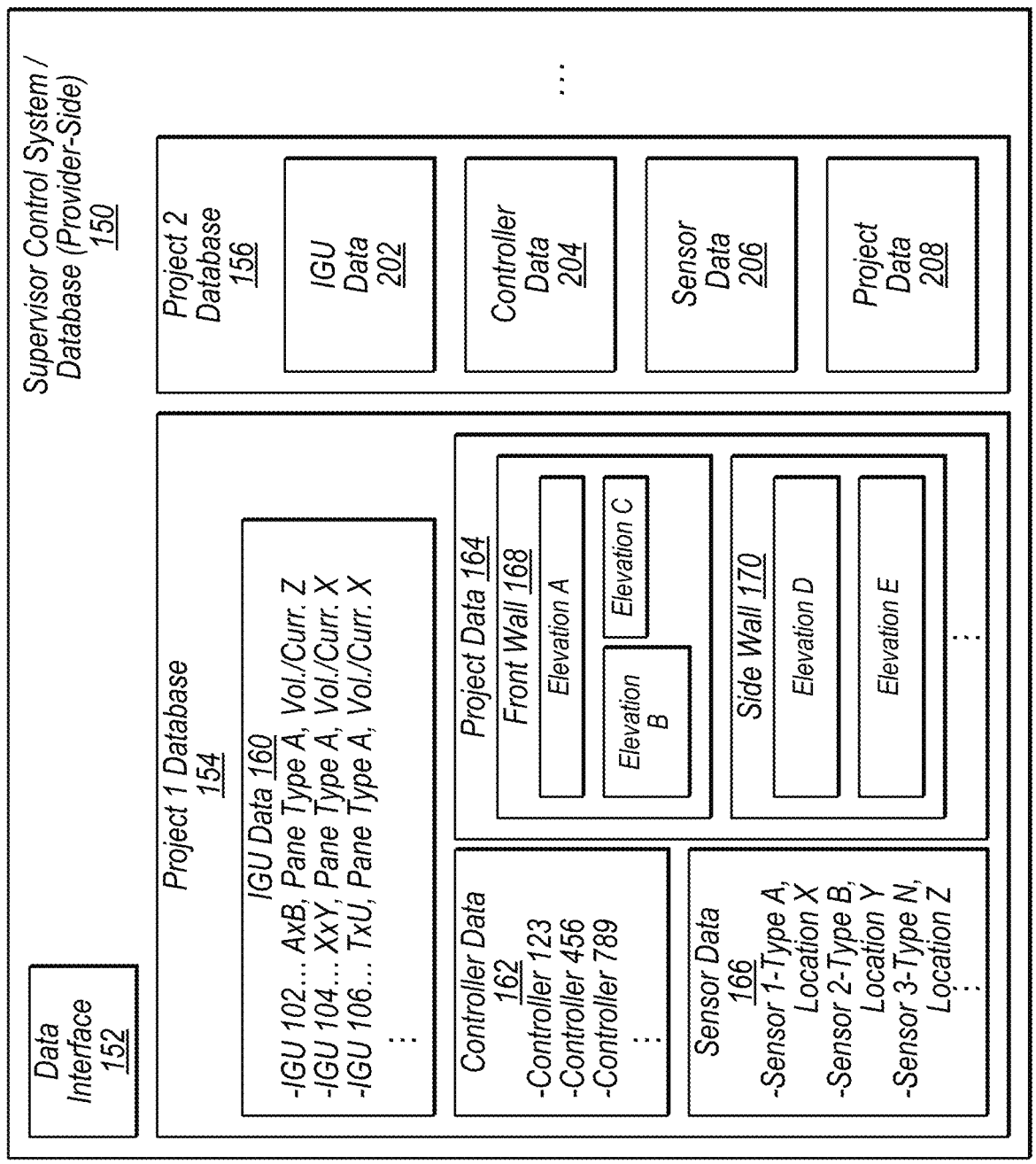
FIG. 2 illustrates a more detailed-view of example data sets included in a project database for an electrochromic glass system to be installed at a customer-site, according to some embodiments.

FIG. 1 illustrates a provider-side supervisory control system and database that is being pre-populated with data-sets for an electrochromic glass system to be installed at a customer-site, according to some embodiments. FIG. 2 illustrates a more detailed-view of example data sets included in a project database for an electrochromic glass system to be installed at a customer-site, according to some embodiments.

In some embodiments, a supervisory control system for an electrochromic glass provider, such as a manufacturer of electrochromic glass, may populate and utilize a centralized database for a project, wherein the database is shared with a corresponding supervisory control system at a customer location where the project is being installed or is already installed. In this way the provider side supervisory control system and the customer-side supervisory control system may utilize the same (or a replica of the same) project database for the project. Furthermore, the provider-side project database may be updated to reflect any field changes that are included in the project database on the customer-site-side. In some embodiments a provider-side database may be pre-populated with data for a project, such as what pieces of glass (e.g. IGUs) are to be included in the project, where the IGUs are to be located on one or more facades of the project, such as faces of a building, the dimensions of the pieces of glass (e.g. IGUs), the required voltages to tint or clear the pieces of glass (e.g. IGUs), the elevations of the pieces of glass, etc. This data and/or other project data may be received via one or more data input interfaces. Additionally, a pre-populated version of a project database may be exported via a project database export interface.

Figure 3:
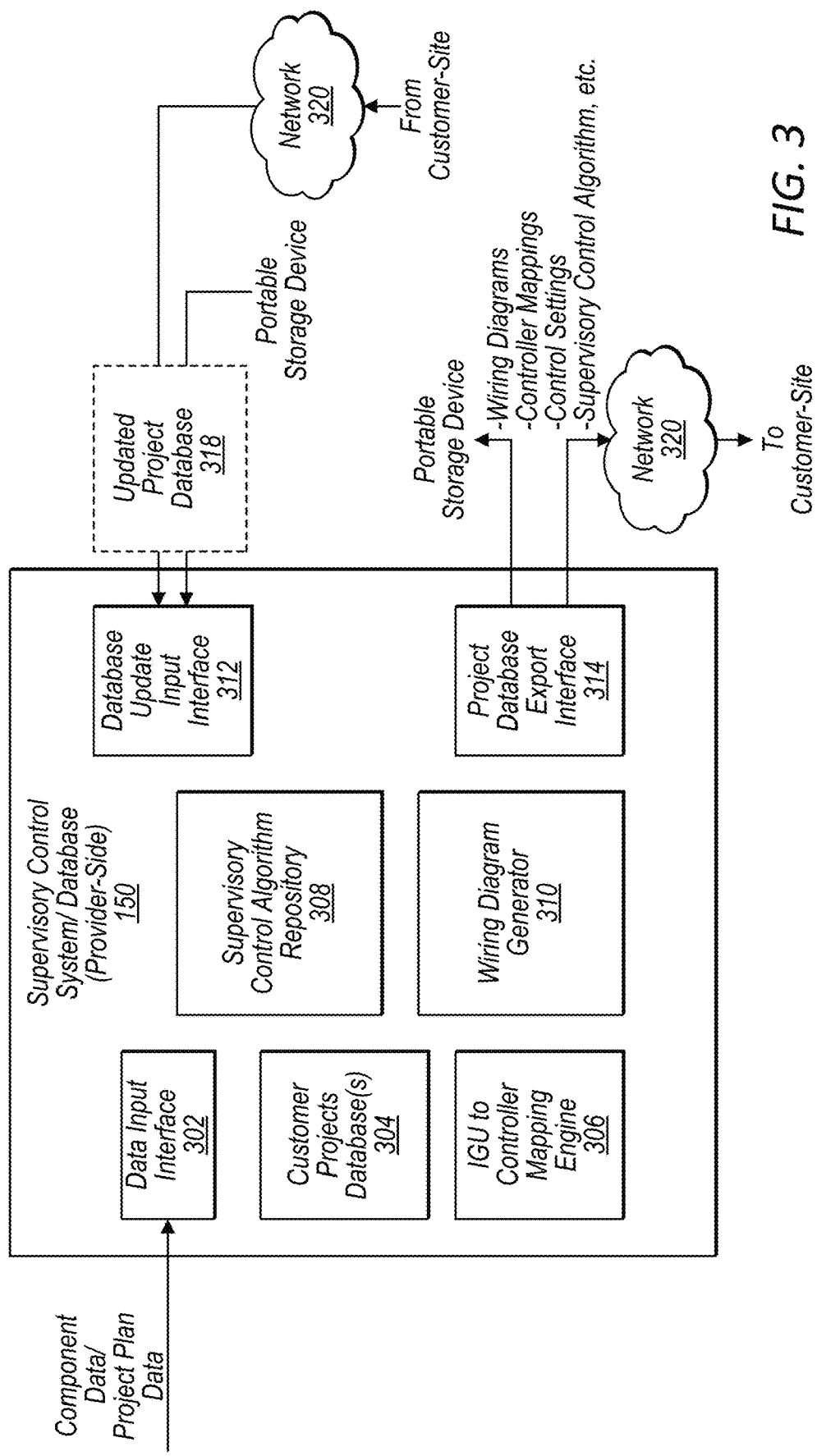
FIG. 3 illustrates additional components included in a provider-side supervisory control system, according to some embodiments.

For example, FIGS. 1-3 illustrate various components that may be included in a provider-side supervisory control system and database, such as supervisory control system and database 150.

For example, supervisory control system and database 150 illustrated in FIG. 1 includes a data input interface 152 and project databases 154, 156, and 158. In some embodiments, a provider-side supervisory control system and database, such as supervisory control system and database 150, may store or be connected to other systems that store any number of project databases, such as a cloud provider that stores project databases.

In some embodiments, a pre-populated project database on a provider-side may include various datasets about an electrochromic glass system to be installed at a customer site. For example, project 1 database 154 includes electrochromic glass unit (e.g. IGU) data 160, controller data 162, project data 164, and sensor data 166.

In some embodiments, IGU data 160 may include dimensions of insulated glass units and pane dimensions of panes of glass included in the insulated glass units. Also, the IGU data 160 may include voltages required to tint and clear respective pieces of glass of the insulated glass units, etc. Additionally, the IGU data 160 may include current and voltages required to operate a pieces of glass of the insulated glass units, respective triggers for tinting or clearing the pieces of glass, zoning information indicating respective zones to which the pieces of glass belong, room assignments for the pieces of glass, which controllers are to be connected to the pieces of glass etc. In some embodiments, the IGU data 160 may include elevations assigned to the respective pieces of glass, directions the respective pieces of glass face (e.g. compass directions, such as North, South, East, West, etc.). In some embodiments, project data 164 may include elevation labels and elevations on a facade associated with the elevations. For example, an elevation label may be above doorway area and a particular elevation height may be assigned to the label. In some embodiments, IGU data 160 may further include elevation identifiers, such as "above doorway" assigned to particular ones of the electrochromic glass units. For example, the elevations A, B, and C as shown in project data 164 in FIG. 2 may be included as characteristics of IGUs listed in IGU data 160. For example IGU dat 160 may further indicate that IGU 106 is at elevation A, IGU 104 is at elevation B, and IGU 102 is at elevation C.

As an example, provider-side supervisory control system and database 150 receives, via data interface 152, electrochromic glass/IGU characteristics for electrochromic glass units 102, 104, and 106, and adds the respective characteristics to IGU data 160 for project 1.

Also, as an example, provider-side supervisory control system and database 150 receives, via data interface 152, controller ID information for controllers 114, 116, and 118 that are included in project 1. Additionally, provider-side supervisory control system and database 150 receives, via data interface 152, sensor information for sensors 120, 122, and 124 that are included in project 1.

In some embodiments, a browser-based interface, such as used by a web-browser, or other similar interface may be implemented by data interface 152 to allow project data to be entered into the supervisory control system and database 150. For example in some embodiments, windows such as shown in FIGS. 6-10 may be implemented by data interface 152 to facilitate entering project data. In some embodiments, a user interface of a supervisory control system and database, such as supervisory control system and database 150, may require a secure log-in credential to be provided before accepting user input via a browser-based interface.

Figure 9:
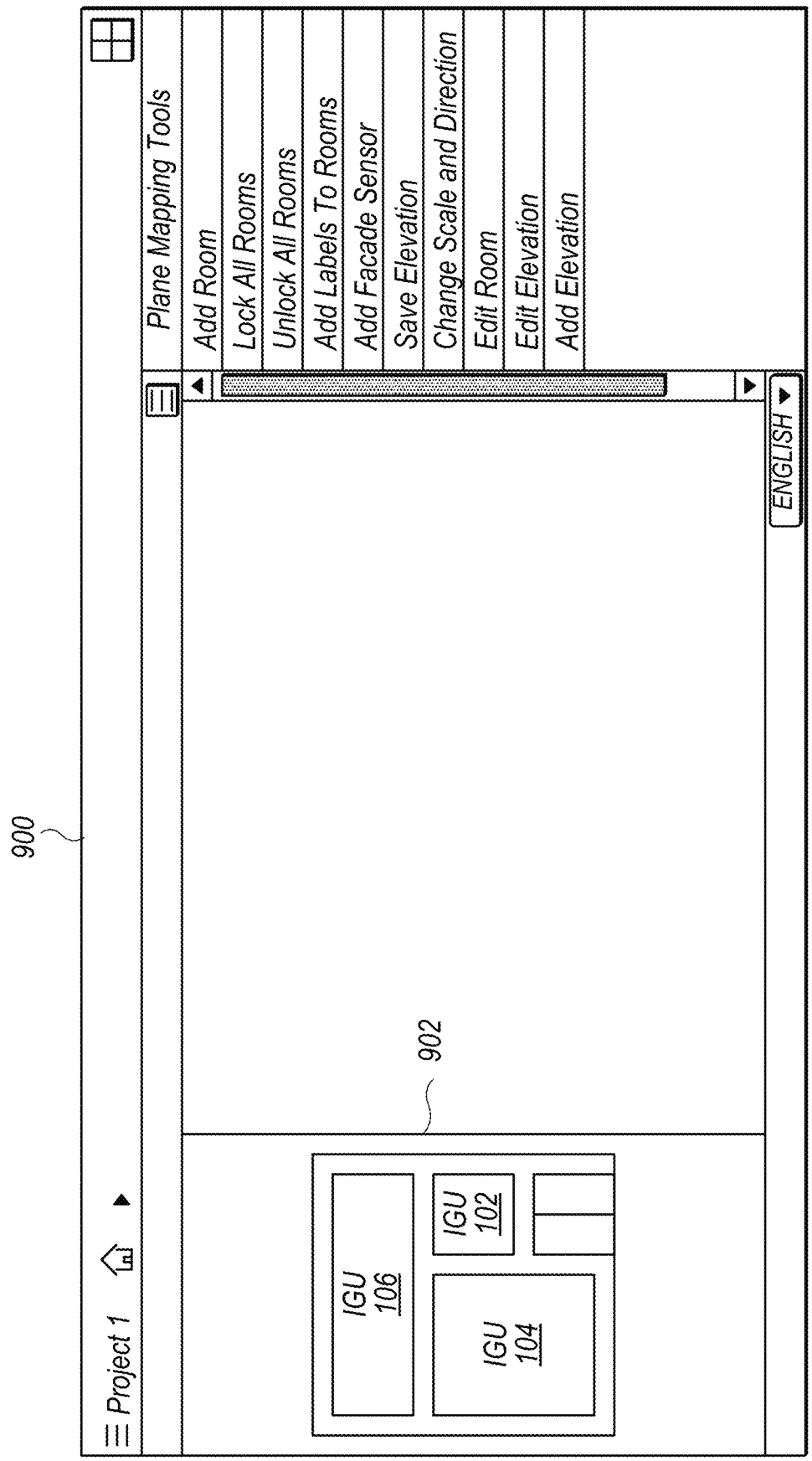
FIG. 9 illustrates an example window of a graphical user-interface for manipulating electrochromic glass unit layouts on a facade of a building for a project, according to some embodiments.

In some embodiments, a user interface to a supervisory control system and database, such as supervisory control system and database 150, may be configured to upload project plan information, such as project plans/drawings 112. In some embodiments, project plans/drawings 112 may include a 3-dimensional model of a building or other facade upon which electrochromic glass units are to be mounted. Also, in some embodiments, project plans/drawings 112 may include two-dimensional drawings of a building or facade upon which electrochromic glass units are to be mounted. Also, project plans/drawings 112 may include elevation drawings, isometric drawings, or other types of drawings that define a facade upon which electrochromic glass units are to be mounted. In some embodiments, data interface 152, or another component of supervisory control system and database 150, may convert project plan information received via data interface 152 into a drawing or graphical representation format used by a graphical interface of the supervisory control system and database 150. For example project plans/drawings 112 may be formatted into a graphical representation of a graphical user interface as shown in FIG. 9, wherein the front facade of the building is represented as a vertical plane and wherein the graphical representation shows placement of IGUs 102, 104, and 106 on the vertical plane, including respective elevations of IGUs 102, 104, and 106.

While, not shown in FIG. 1, in some embodiments a project database, such as project 1 database 154, may further include other datasets for a project, such as wiring lengths for controllers or control panels, a number and location of control panels, etc. Also, in some embodiments, mappings between IGUs, such as IGUs 102, 104, and 106, and controllers, such as controllers with controller IDs 123, 456, and 789, may be stored in a project database, such as project 1 database 154. For example, FIG. 2 illustrates more detailed examples of data that may be included in project 1 database 154. As an example, project data 164, includes a front wall layout 168 illustrating relative positions and elevations of IGUs 102, 104, and 106. Project data 164 also includes a side wall layout 170 illustrating relative positions and elevations of IGUs 108 and 110.

In addition, FIG. 2 illustrates datasets that may be included in other project databases associated with provider-side supervisory control system 150. For example, project 2 database 156 includes IGU data 202, controller data 204, sensor data 206, and project data 208. In some embodiments, a project database, such as project 1 database 154 or project 2 database 156 may include any number of datasets, such as data sets 160, 162, 164, and 166 of project 1 database 154 or such as data sets 202, 204, 206, and 208 of project 2 database 156.

FIG. 3 illustrates additional components included in a provider-side supervisory control system, according to some embodiments.

For example, provider-side supervisory control system and database 150 may include data input interface 302, which may receive similar types of datasets as data interface 152 illustrated in FIGS. 1 and 2. Also, provider-side supervisory control system and database 150 may include multiple customer project databases 304, such as project 1 database 154, project 2 database 156 and project N database 158. Provider-side supervisory control system and database 150 may additionally include another data input interface, such as database update/input interface 312. In some embodiments, database update/input interface 312 may receive updated versions of a project database from another corresponding supervisory control system and database, such as a customer-site-side supervisory control system and database. In some embodiments, an updated project database 318 received via database update/input interface 312 may include field modifications or other changes that reflect a current as-built state of an electrochromic glass system installed at a customer site.

Also, provider-side supervisory control system and database 150 may include a project database export interface 314 configured to export a current version of a project database, such as project 1 database 154, to a customer-site-side supervisory control system. In some embodiments export and import of project databases or updates to a project database, between a provider-side database and a customer-site-side database, may be performed by storing a version of the database being exported/imported on a portable storage device, such as a USB drive, flash-drive, hard drive, portable computing device, or other portable storage device. Also, in some embodiments a secure connection may be established via a public or private network, such as network 320, between a provider-side site and a customer site, wherein database updates are communicated between the provider-side site and the customer site via a secure network connection via network 320. In some embodiments, a supervisory control system and database, may be located behind a firewall and may establish a connection using a virtual private network (VPN), secure shell protocol, etc. In some embodiments, a communication may include a FIN flag, such as in a TCP communication to indicate the end of a transmission.

In some embodiments, supervisory control system 150 includes electrochromic glass unit (e.g. IGU) to controller mapping engine 306. In some embodiments, electrochromic glass unit (e.g. IGU) to controller mapping engine 306 may map IGUs to controller IDs for IGUs and controllers to be installed (or already installed) at a customer site for a project. In some embodiments, electrochromic glass unit (e.g. IGU) to controller mapping engine 306 may automatically update mappings in response to design changes received prior to installation or in response to modifications performed at or subsequent to the time of installation. For example, an as-built configuration may be imported via database/update input interface 312 and customer project databases 304 may be automatically updated to reflect the updates, and electrochromic glass unit (e.g. IGU) to controller mapping engine 306 may automatically update mappings taking into account the as-built updates, as an example.

In some embodiments, a supervisory control system 150 may also include a supervisory control algorithm repository 308 storing supported control algorithms that may be selected for use in controlling IGUs of an electrochromic glass system. For example control algorithms may include shade/glare algorithms, scene creation algorithms, etc. In some embodiments, a project database, such as project 1 database 154 or other customer project databases of customer project databases 304 may specify supervisory control algorithms to be used to control respective supervisory controllers associated with the customer projects.

In some embodiments, supervisory control system 150 may also include a wiring diagram generator 310 configured to automatically generate wiring diagrams for a project, wherein the wiring diagrams are generated based on mappings determined by IGU to controller mapping engine 306, and wherein the wiring diagrams illustrate wiring connections between IGUs, controllers, control panels, junction boxes, and a customer-site computer that implements a customer-site-side supervisory control system and database.

Example Customer-Site Supervisory Control
System and Database

Figure 4:
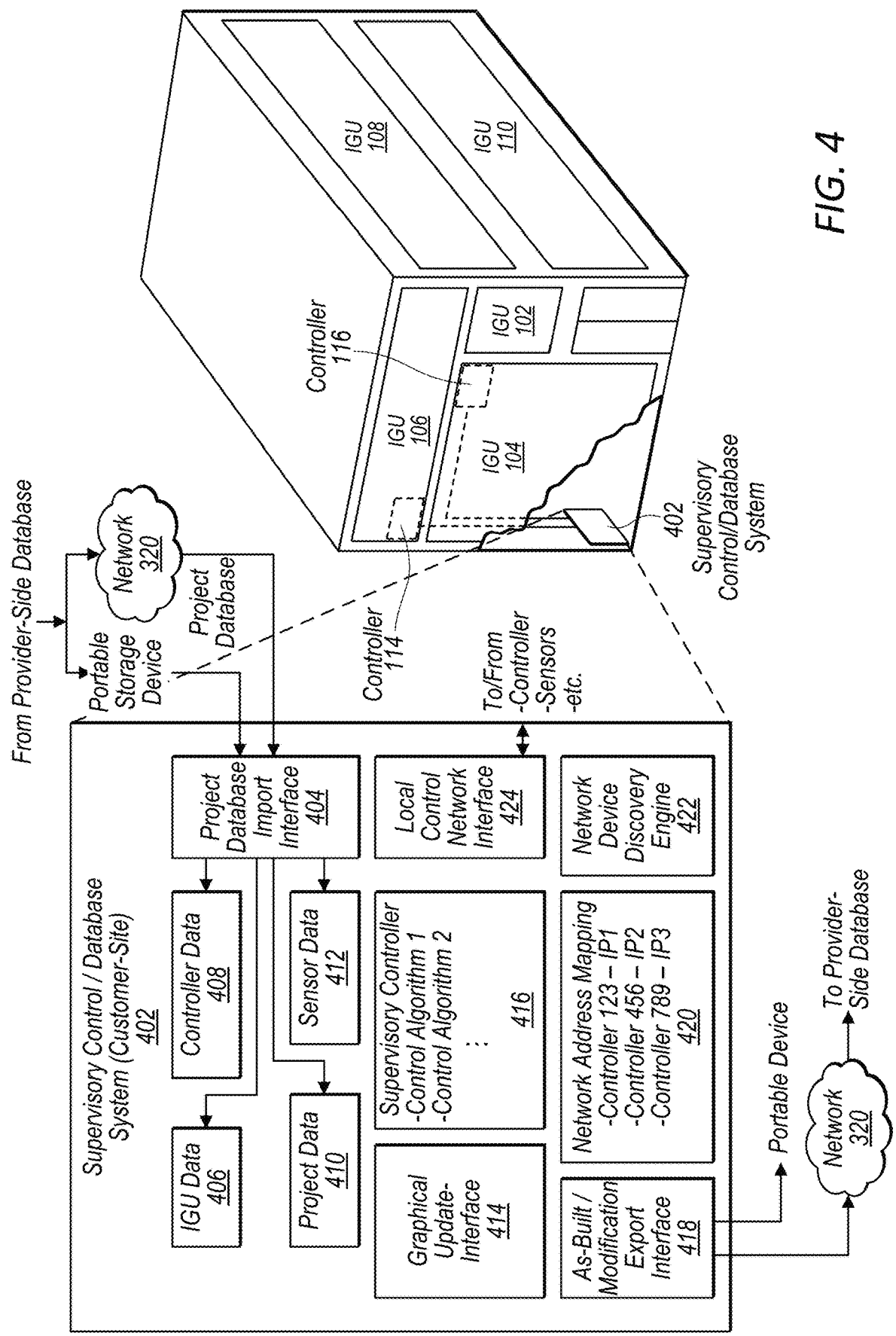
FIG. 4 illustrates a customer-site supervisory control system and database for an electrochromic glass system installed at a customer-site, according to some embodiments.

FIG. 4 illustrates a customer-site supervisory control system and database for an electrochromic glass system installed at a customer-site, according to some embodiments.

As mentioned previously, a database used by a customer-site supervisory control system may be synchronized with a provider-side database for a given customer project. For example, a pre-populated version of the database for the customer project may be exported from a provider-side supervisory control system and database, such as supervisory control system and database 150, and may be imported into a customer-site supervisory control system and database.

For example, a pre-populated project database, such as project 1 database 154, may be imported to supervisory control system and database 402 via project database import interface 404. In some embodiments, the project database may be imported by connecting a portable device storing the project database to project database import interface 404, or a secure network connection to a provider-side supervisory control system and database may be used to import the project database. For example, a secure connection between supervisory control system and database 402 and supervisory control system and database 150 may be established via network 320.

In some embodiments, project database import interface 404 may utilize an imported project database to automatically populate or update datasets for an electrochromic glass system installed at the customer site that is controlled, or to be controlled, by the supervisory control system and database 402. For example, project database import interface 404 may populate IGU data 406, controller data 408, project data 410, sensor data 412, etc. with data imported via project database import interface 404. In some embodiments, project database import interface 404 may further populate supervisory controller 416 with one or more selected control algorithms to be used to control an electrochromic glass system installed at the customer site. Also, in some embodiments, project database import interface 404 may further populate controller to IGU mapping data (not shown).

Also, in some embodiments, supervisory control system and database 402 (and/or supervisory control system and database 150) may implement a graphical update interface 414 configured to receive layout updates of IGUs, controllers, sensors, etc. For example, graphical update interface 414 may implement a graphical interface similar to as shown in FIG. 9.

In some embodiments, as-built modifications may be entered during commissioning via graphical update-interface 414 and supervisory control system and database 402 may automatically update respective ones of the datasets, such as 406, 408, 410, 412, etc. to reflect the updates. Also, supervisory control system and database 402 may automatically update mappings and wiring diagrams based on updates entered via graphical update interface 414.

In some embodiments, supervisory control system and database 402 may include as-built/modification export interface 418 configured to export updates and/or a complete current version of the project database. For example the updates or current version of the project database may be communicated to a provider-side supervisory control system and database, such as supervisory control system and database 150, via a secure network connection over network 320. Also, the updates and/or current version of the project database may be exported to a portable storage device, wherein the portable storage device is then connected to a database update input interface 312 of a supervisory control system and database 150.

Figure 14:
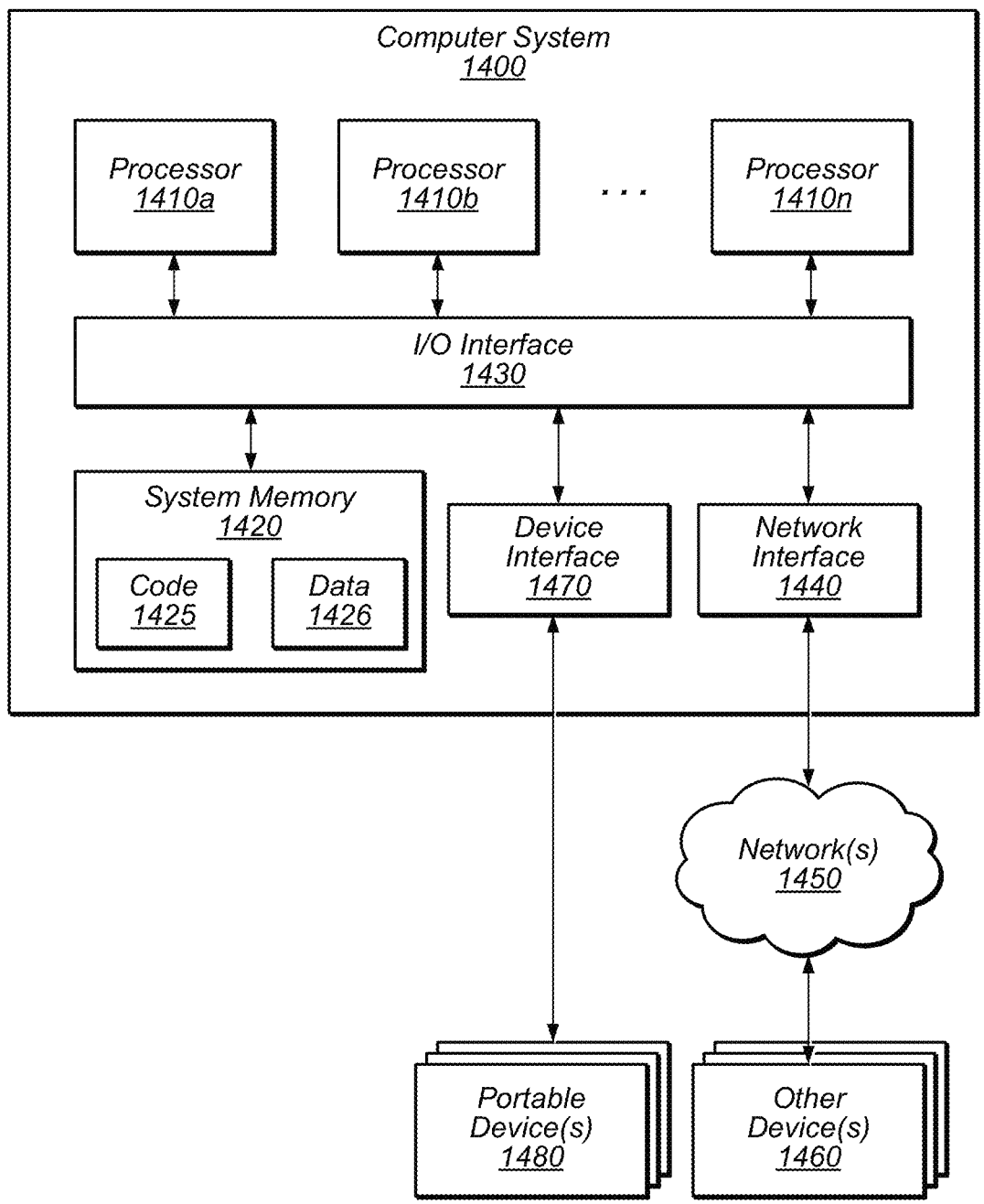
FIG. 14 illustrates an example computer system, according to some embodiments.

Also, in some embodiments, a supervisory control system and database 402 at a customer site may be implemented on a local computer connected to an Ethernet network, wherein other system components such as controllers, sensors, user interfaces (e.g. switches), etc. are also connected to the Ethernet network. For example, FIG. 4 illustrates a computer that implements supervisory control system and database 402 that is connected to controllers 114, 116 (and 118) via an Ethernet network. In some embodiments, the computer that implements supervisory control system and database 402 may be a computer system as illustrated in FIG. 14. Also, in some embodiments, a computer system as illustrated in FIG. 14 may implement a provider-side supervisory control system and database, such as supervisory control system and database 150.

In some embodiments, each of the system components, such as controllers, switches, sensors, etc. may include a dynamic host configuration protocol (DHCP) module that selects a dynamic Internet Protocol address for the system component. In some embodiments, supervisory control system and database 402 may include a network device discovery engine 422 that listens for advertised network addresses of components connected to the Ethernet network. The network device discovery engine may establish communications with devices connected to the network and determine/request identifiers of the devices, such as controller identifiers of controllers, such as controllers 114 and 116. The network device discovery engine 422 may pass the controller identifiers to network address mapping component 420. The network address mapping component 420 may verify that the component identifiers are included in the project. For example, network address mapping component 420 may verify that identifiers for controllers 114 and 116 are included in controller data 408. If verified, the network address mapping component 420 may assign static IP addresses to the system components and store network address mappings for the system component identified on the Ethernet network.

In some embodiments, using static IP addresses for system components may allow a supervisory control system to subsequently skip a network device discovery process, for example when recovering from a power failure, as an example. Also, the network address mapping component may communicate the assigned static IP addresses back to the respective system components, wherein the respective system components store their assigned static IP addresses for use in future communications with the supervisory control system and database 402. In some embodiments, supervisory controller 416 may execute a selected control algorithm to control IGUs 102, 104, 106, 108, and 110 and may issue control commands to the respective controllers 114, 116, etc. via local control network interface 424.

Figure 5:
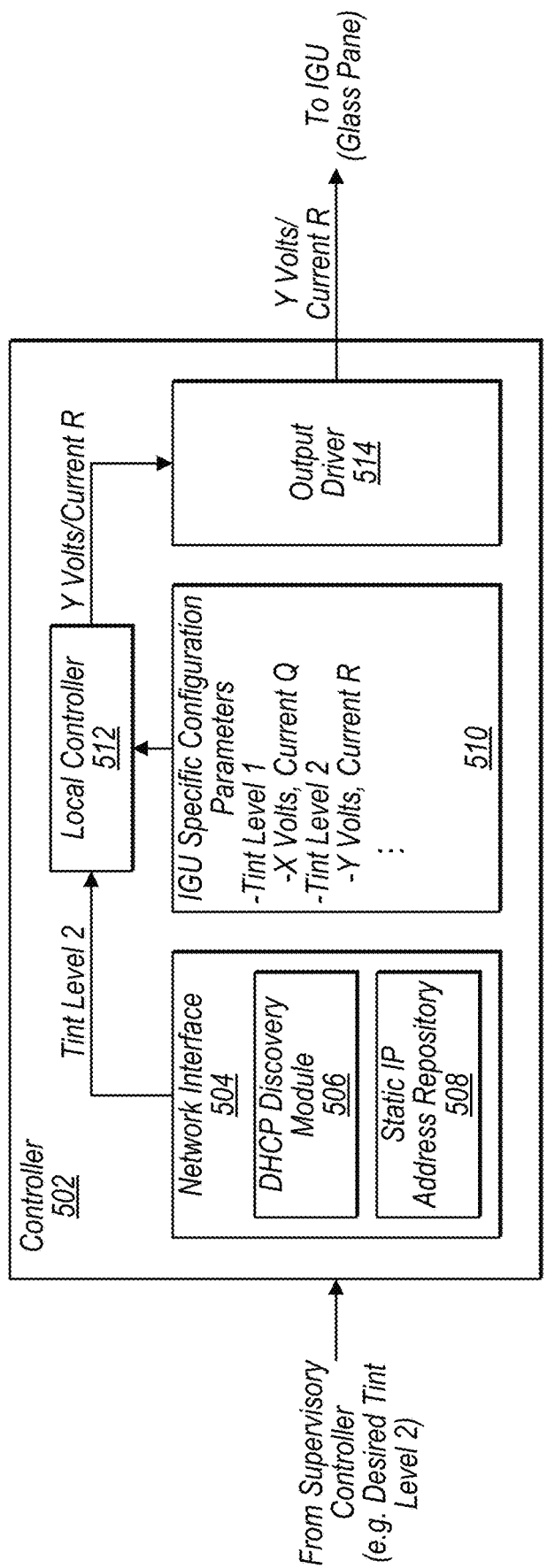
FIG. 5 illustrates example components of a controller for an individual electrochromic glass unit, according to some embodiments.

FIG. 5 illustrates example components of a controller for an individual electrochromic glass unit, according to some embodiments.

In some embodiments, a controller for an electrochromic glass unit (e.g. IGU), such as controller 502, includes a network interface 504, a configuration parameters module 510, a local controller 512, and an output driver 514.

In some embodiments, network interface 504 includes DHCP discovery module 506 and static IP address repository 508. As discussed above, the DHCP discovery module 506 may execute a DHCP protocol to advertise a dynamic IP address to initiate communication with a supervisory control system and database, such as supervisory control system and database 402. Then, once a static IP address is assigned for controller 502, the static IP address may be stored in static IP address repository 508.

In some embodiments, a controller for an electrochromic glass unit (e.g. IGU), such as controller 502, may receive a control command from a supervisory control system, such as supervisory control system 402 and convert the control command into a voltage/current output to drive a connected electrochromic glass unit (e.g. IGU) to a desired control state indicated in the received control command. For example, supervisory control system 402 may issue, via local control network interface 424, a command to control an electrochromic glass unit (e.g. IGU) associated with controller 502 to a particular tint level, as an example tint level 2. The local controller 512, may coordinate with configuration parameters module 510 to determine the specific electrochromic glass unit (e.g. IGU) attached to controller 502 requires Y volts and/or current R to achieve a tint level 2. The local controller 512 may then cause output driver 514 to output Y volts and/or current R to control the attached IGU to tint level 2. A similar process may be used to control the attached IGU to various other tint levels and/or to clear tint levels. In some embodiments, an attached IGU may be controlled to a plurality of tint levels. For example, an IGU may be controlled to 4 or 8 different tint levels in some embodiments.

Example Browser-Based User Interface Windows

FIG. 6 illustrates an example window of a user interface of a supervisory control system for entering characteristics of an electrochromic glass unit to a project, according to some embodiments.

For example, in some embodiments, a project designer or other user may specify a reference number for a type/size of electrochromic glass units to be added to a project. The designer/user may also specify a quantity of the specific type of electrochromic glass units to be added to the project. In some embodiments other characteristics of the electrochromic glass units may be specified, such as a number of bus bars, a shape of the glass, a glass type, etc. In some embodiments, IGU dimensions may be entered and the system may automatically determine pane dimensions based on the IGU dimensions. Once the respective fields are populated, the designer/user may select "create" to add the specified type of electrochromic glass unit to the project.

FIG. 7 illustrates an example window of a user interface of a supervisory control system for entering elevations for a project, according to some embodiments.

In some embodiments, a designer/user may specify elevation options for elevations to be assigned to electrochromic glass units included in a project. For example an elevation name may be chosen, such as first floor, second floor, over-door panel, etc. Also an orientation direction of the electrochromic piece of glass may be specified. For example, compass coordinates corresponding to compass directions may be assigned as part of a characteristic of an elevation. As an example, the side wall may face east and may be assigned a direction of 90°, where north is 0/360° and south is 180°, as an example. Also, a height and width may be assigned to the elevation option. In some embodiments, some electrochromic glass units (e.g. IGUs) may be installed at an angle relative to a vertical plane, such as at a slope or incline (as opposed to being mounted straight up and down vertical). In such embodiments, another characteristic specified for an elevation may be slope or incline. Once populated, a designer/user may select "OK" to add the elevation as an elevation option for the project.

FIG. 8 illustrates an example window of a user interface of a supervisory control system for managing electrochromic glass units for a project, according to some embodiments.

In some embodiments, a designer/user may review a list of electrochromic glass units to be included in a project and manage the list using a window as shown in FIG. 8. In some embodiments a list of electrochromic glass units to be used in a project may be imported into a supervisory control system and database, for example from a glass vendor. In other embodiments, a designer/user may create new entries, for example by clicking "add new" and populating a window as shown in FIG. 6.

FIG. 9 illustrates an example window of a graphical user-interface for manipulating electrochromic glass unit layouts on a facade of a building for a project, according to some embodiments.

In some embodiments, a graphical user interface of a supervisory control system (either at a provider-side site or a customer site) may allow a designer/user/commissioning team member to drag and drop system components to update a design for an electrochromic glass system. For example graphical field 902 of window 900 may represent a facade of a building included in project 1. In some embodiments, a designer/user/commissioning team member may drag and drop IGUs 102, 104, and 106 on the facade to arrange the IGUs on the facade to create a layout of the IGUs. In some embodiments, a graphical user interface may be used to update controller mappings, elevations, etc. in response to a designer/user/commissioning team member dragging and dropping electrochromic glass units on a facade. In some embodiments, a designer/user/commissioning team member may add or modify various other components included in a project layout for the facade, such as sensors, controllers, switches, etc.

FIG. 10 illustrates an example window of a user interface of a supervisory control system for a controller discovery process, according to some embodiments.

In some embodiments, a commissioning team member may initiate a network device discovery process, such as performed by network device discovery engine 422, via a window as shown in FIG. 10. In some embodiments, a network device discovery engine 422 may automatically assign static IP addresses or may allow user input in the process of assigning static IP addresses.

Figure 11:
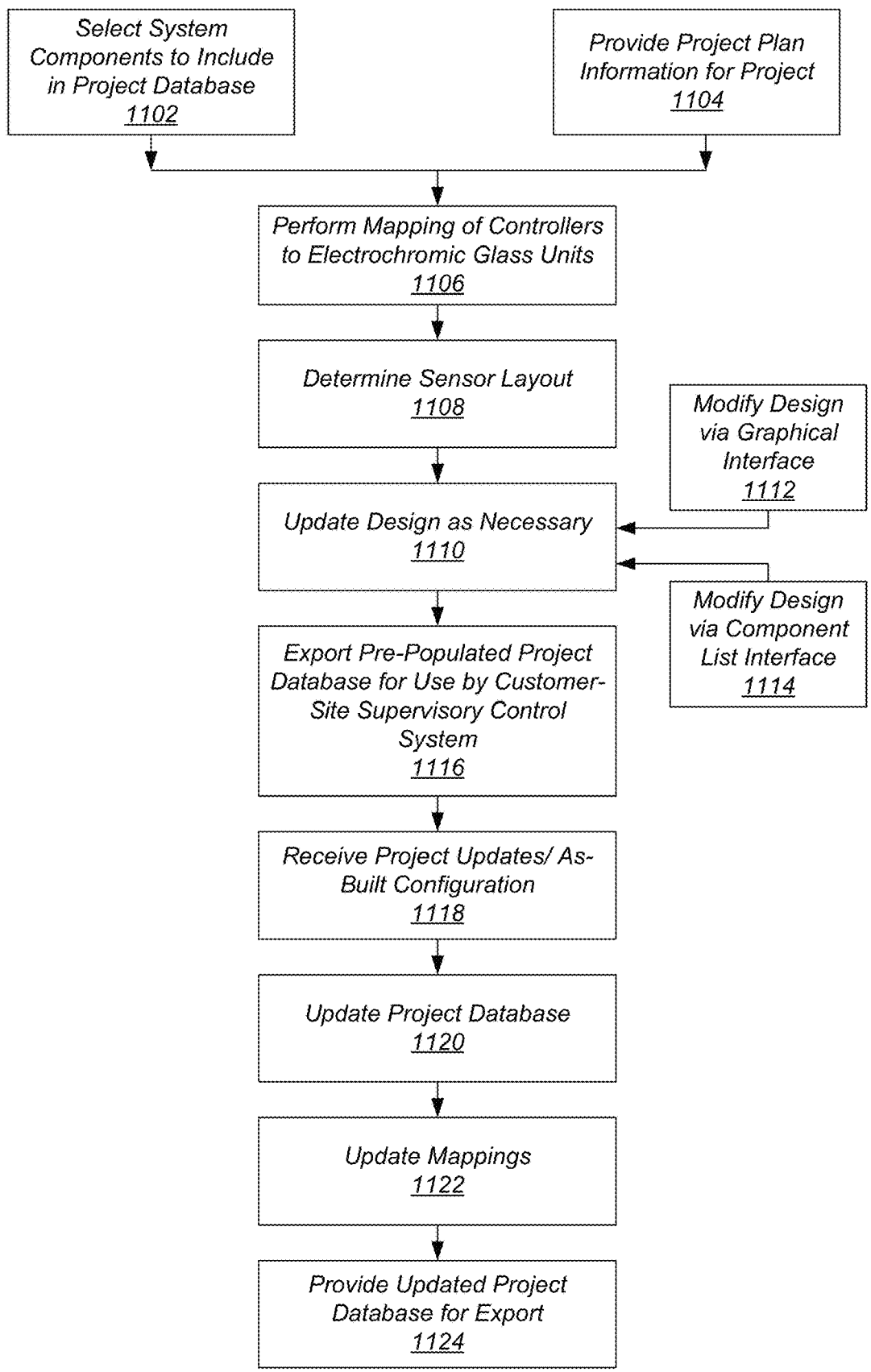
FIG. 11 illustrates an example flowchart for a process of pre-populating, exporting, and updating a project database for an electrochromic glass system to be installed/installed at a customer-site, according to some embodiments.

Example Processes for Configuring, Commissioning, and Operating an Electrochromic Glass System FIG. 11 illustrates an example flowchart for a process of pre-populating, exporting, and updating a project database for an electrochromic glass system to be installed/installed at a customer-site, according to some embodiments.

At 1102, system components to be included in a project, such as an electrochromic glass system to be installed at a customer-site, are selected. In some embodiments, the components may be selected via browser-based windows, such as the windows shown in FIGS. 6, 8, and 9.

At 1104, project plan information, such as drawings, diagrams, etc. is provided to the supervisory control system and database. For example, project plan information may be uploaded via a browser-based window as shown in FIG. 7. For example by clicking the "choose file" button and selecting a file comprising project plans.

At 1106, a mapping engine, such as IGU to controller mapping engine 306, maps controllers included in the project to corresponding electrochromic glass units (e.g. IGUs) to be controlled by the controllers. However, the controllers may be initially installed at a customer site as "blank" controllers without specific configurations already installed on the controllers. As discussed in FIG. 12 the controllers may later be configured at the customer site using the mappings determined at 1106 (or updated at 1110 or 1122).

At 1108, a sensor layout is determined for the project. In some embodiments, a designer may design the sensor layout using a graphical interface as shown in FIG. 9.

At 1110, the project design (e.g. electrochromic glass unit layouts on respective facades, sensor layouts, controller layouts, etc.) may be updated. In some embodiments, the design may be updated/modified via a graphical user interface at 1112. For example the graphical user interface as shown in FIG. 9 may be used to updated/modify one or more layouts for a project. Also, at 1114, a design or layout for a project may be updated by altering a component list for the project. For example, a window as shown in FIG. 6 or 8 may be used to update a component list for a project. In some embodiments, updating the design as necessary at 1110 may be performed prior to installation of system components at a customer site. Also the updates to the design may cause a project database and associated mappings to be automatically updated.

At 1116, the updated project database including controller to IGU mappings may be exported as a pre-populated database. The pre-populated database may be imported to a supervisory control system and database at the customer-site where the project is to be installed.

In some embodiments, further updates/modifications to the electrochromic glass system may be performed as part of a commissioning process for the electrochromic glass system. At 1118, the provider-side supervisory control system and database may receive project updates/as-built configurations. For example the project updates/as-built configurations may be received via a database update input interface 312. In some embodiments, at 1120 the provider-side supervisory control system may automatically update a project database for the project to reflect the project updates/as-built configuration. Also, at 1122, the provider-side supervisory control system may automatically update mappings for the project based on the updates and as-built configuration.

At 1124, the supervisory control system may further provide the updated project database for export. In some embodiments, the updated project database may further be updated on the provider-side, such as at 1110, before being exported. For example, improvements to the installed electrochromic glass system may be designed using the updated provider-side database and may later be exported as part of an upgrade to the installed electrochromic glass system.

Figure 12:
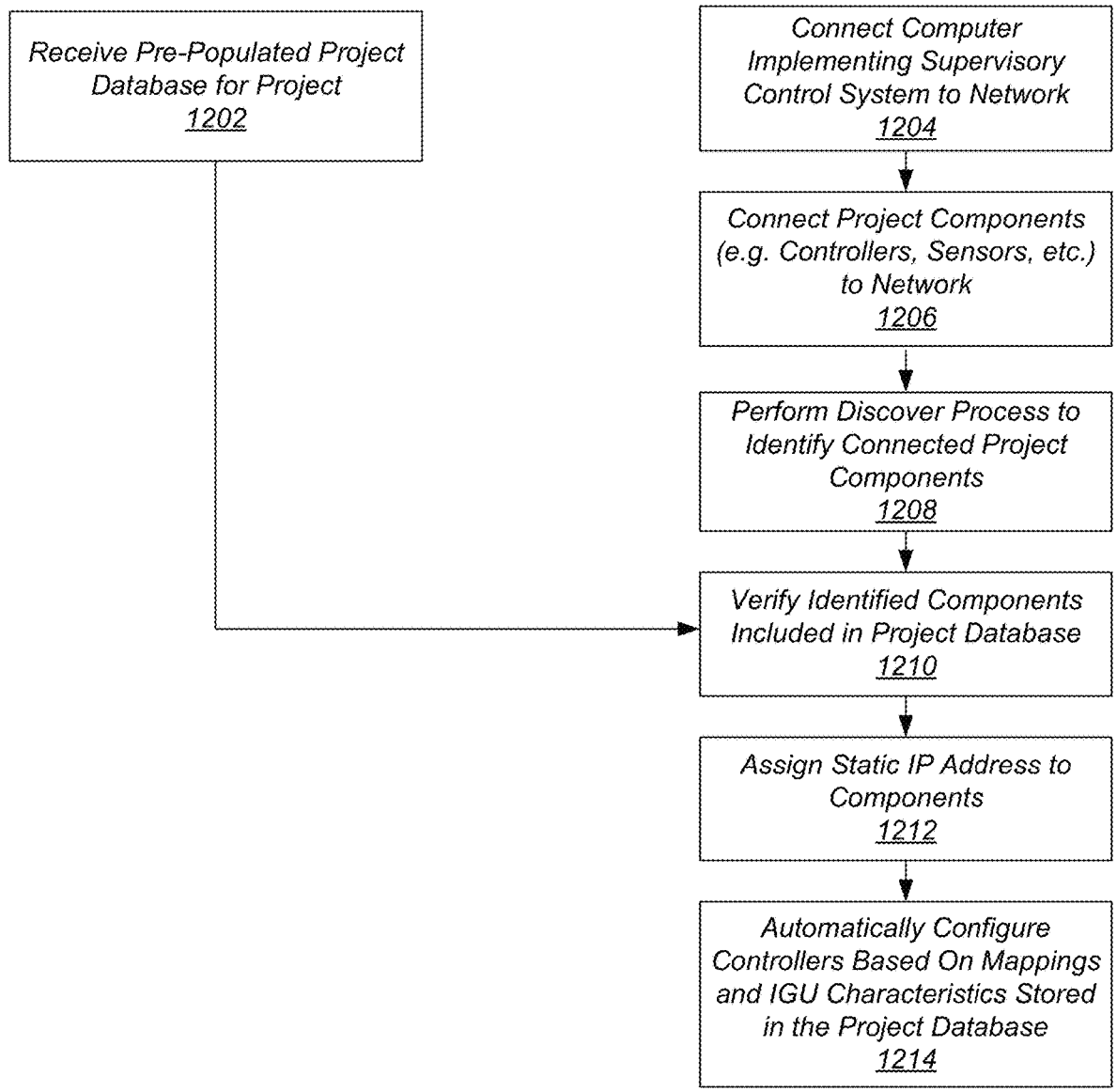
FIG. 12 illustrates an example flowchart for a process of commissioning an electrochromic glass system at a customer-site using a pre-populated project database, according to some embodiments.

FIG. 12 illustrates an example flowchart for a process of commissioning an electrochromic glass system at a customer-site using a pre-populated project database, according to some embodiments.

At 1202, a supervisory control system implemented on a computer system installed at a customer site receives a pre-populated project database from a provider-side supervisory control system and database. For example supervisory control system and database 402 may receive an exported pre-populated project database from supervisory control system and database 150.

At 1204, the computer system implementing the customer site supervisory control system is connected to a local network at the customer site, such as an Ethernet network.

At 1206, other system components, such as controllers for electrochromic glass units (e.g. IGUs), sensors, switches, etc. are connected to the local network at the customer site, such as the Ethernet network.

At 1208, a discovery process is performed to identify the system components. For example a similar discovery process as described in regard to FIGS. 4 and 5 may be performed.

At 1210, components connected to the local network identified during the discovery process are verified to be system components for the electrochromic glass system being commissioned at the customer site by comparing identifiers of the system components to identifiers of system components included in the pre-populated database for the project.

At 1212, static IP addresses are assigned to the verified system components. Also, at 1214, the controllers are automatically configured at the customer site based on mappings for the controllers stored in the pre-populated database and based on electrochromic glass unit characteristics stored in the pre-populated database for electrochromic glass units mapped to the respective controllers.

Figure 13:
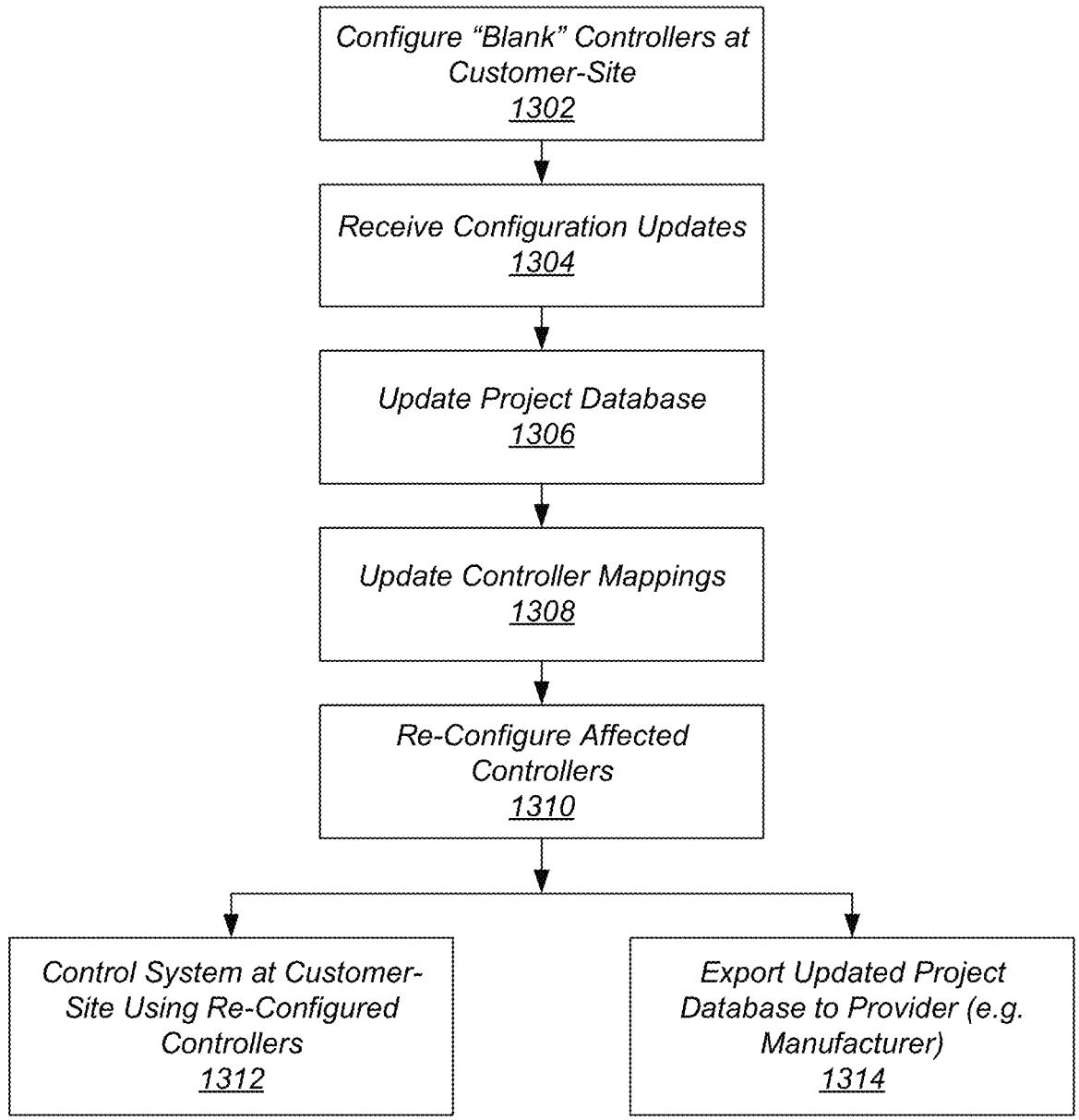
FIG. 13 illustrates an example flowchart for a process of controlling an electrochromic glass system at a customer-site using a supervisory control system and associated project database and updating the project database, according to some embodiments.

FIG. 13 illustrates an example flowchart for a process of controlling an electrochromic glass system at a customer-site using a supervisory control system and associated project database and updating the project database, according to some embodiments.

At 1302, "blank" controllers (e.g. controllers not yet configured with specific characteristics/parameters for a particular electrochromic glass unit) are installed at a customer site and the "blank" controllers installed at the customer site are specifically configured, at the customer-site, for respective electrochromic glass units to be controlled by the respective controllers.

At 1304, a supervisory control system and database at the customer site receives configuration updates. For example the configuration updates may be received via a graphical user interface, a window interface, or by importing an updated project database, as a few examples.

At 1306, the project database maintained for use by the supervisory control system at the customer site is updated to reflect the configuration changes received at 1304.

At 1308, controller mappings to respective electrochromic glass units (e.g. IGUs) is updated as necessary based on the configuration updates received at 1304.

At 1310, the supervisory control system and database at the customer site automatically re-configures controllers affected by the configuration updates such that the updated controllers are specifically configured to control respective electrochromic glass units coupled to the controllers in accordance with the updated configuration.

At 1312, the supervisory control system and database at the customer site controls the electrochromic glass system installed at the customer site using the re-configured controllers and/or controllers that were not affected by the configuration updates.

At 1314, the supervisory control system and database at the customer site exports the updated project database to a provider of the electrochromic glass system, such as a manufacturer of the electrochromic glass system. The exported updated database may be used to update a corresponding copy of the project database maintained by the provider (e.g. manufacturer).

Example Computer System

FIG. 14 illustrates an example computer system that may be used in some embodiments.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may implement the functionality described herein (e.g., the functionality of various computing devices or servers and other components that implement the supervisory control system at the provider site and/or the customer site and the associated project databases as described herein). The various methods as illustrated in the figures and described herein represent example embodiments of methods. The order of any method may be changed, and various elements may be added, reordered, combined, omitted, modified, etc.

FIG. 14 is a block diagram illustrating a computer system according to various embodiments, as well as various other systems, components, services or devices described above. For example, computer system 1400 may implement a provider-side supervisory control system, a provider-side project database, a customer-site-side supervisory control system, a customer-site-side project database, or a combination thereof, in different embodiments. Computer system 1400 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1400 includes one or more processors 1410 (any of which may include multiple cores, which may be single or multi-threaded) coupled to a system memory 1420 via an input/output (I/O) interface 1430. Computer system 1400 further includes a network interface 1440 coupled to I/O interface 1430. In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. The computer system 1400 also includes one or more network communication devices (e.g., network interface 1440) for communicating with other systems and/or components over a communications network (e.g. Internet, LAN, etc.). For example, a supervisory control system executing on system 1400 may use network interface 1440 to communicate with a remote supervisory control system executing on a single server or on a cluster of servers that implement one or more of the components of the supervisory control and database systems described herein. In another example, a supervisory control system executing on computer system 1400 may use network interface 1440 to communicate with other instances of the supervisory control system (implemented at other locations) that may be implemented on other computer systems (e.g., computer systems 1460).

In the illustrated embodiment, computer system 1400 is coupled to one or more portable storage devices 1480 via device interface 1470. In various embodiments, portable storage devices 1480 may correspond to disk drives, tape drives, solid state memory, other storage devices, or any other persistent storage device. Computer system 1400 (or a distributed application or operating system operating thereon) may store instructions and/or data in portable storage devices 1480, as desired, and may retrieve the stored instruction and/or data as needed.

Computer system 1400 includes one or more system memories 1420 that can store instructions and data accessible by processor(s) 1410. In various embodiments, system memories 1420 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1420 may contain program instructions 1425 that are executable by processor(s) 1410 to implement the methods and techniques described herein. In various embodiments, program instructions 1425 may be encoded in platform native binary, any interpreted language such as Java™ byte-code, or in any other language such as C/C++, Java™, etc., or in any combination thereof. For example, in the illustrated embodiment, program instructions 1425 include program instructions executable to implement the functionality of a supervisory control system, local controller, project database, etc., in different embodiments. In some embodiments, program instructions 1425 may implement multiple supervisory control system, project databases, and/or other components.

In some embodiments, program instructions 1425 may include instructions executable to implement an operating system (not shown), which may be any of various operating systems, such as UNIX, LINUX, Solaris™, MacOS™, Windows™, etc. Any or all of program instructions 1425 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1400 via I/O interface 1430. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1440.

In some embodiments, system memory 1420 may include data store 1426, which may be implemented as described herein. For example, the information described herein as being stored by the project database may be stored in data store 1426, or in another portion of system memory 1420 on one or more nodes, in other devices 1460.

In one embodiment, I/O interface 1430 may coordinate I/O traffic between processor 1410, system memory 1420 and any peripheral devices in the system, including through network interface 1440 or other peripheral interfaces, such as device interface 1470. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments, some or all of the functionality of I/O interface 1430, such as an interface to system memory 1420, may be incorporated directly into processor 1410.

Network interface 1440 may allow data to be exchanged between computer system 1400 and other devices attached to a network, such as other computer systems 1460. In addition, network interface 1440 may allow communication between computer system 1400 and various I/O devices and/or remote storage devices. Input/output devices may, in some embodiments, include one or more display terminals, keyboards, keypads, touchpads, scanning devices, voice or optical recognition devices, or any other devices suitable for entering or retrieving data by one or more computer systems 1400. Multiple input/output devices may be present in computer system 1400 or may be distributed on various nodes of a distributed system that includes computer system 1400. In some embodiments, similar input/output devices may be separate from computer system 1400 and may interact with one or more nodes of a distributed system that includes computer system 1400 through a wired or wireless connection, such as over network interface 1440. Network interface 1440 may commonly support one or more wireless networking protocols (e.g., Wi-Fi/IEEE 802.11, or another wireless networking standard). However, in various embodiments, network interface 1440 may support communication via any suitable wired or wireless general data networks, such as other types of Ethernet networks, for example. Additionally, network interface 1440 may support communication via telecommunications/telephony networks such as analog voice networks or digital fiber communications networks, via storage area networks such as Fibre Channel SANs, or via any other suitable type of network and/or protocol. In various embodiments, computer system 1400 may include more, fewer, or different components than those illustrated in FIG. 14 (e.g., displays, video cards, audio cards, peripheral devices, other network interfaces such as an ATM interface, an Ethernet interface, a Frame Relay interface, etc.)

In some embodiments, a web-based browser interface for a supervisory control system may be implemented using Representational State Transfer ("RESTful") techniques rather than message-based techniques. For example, a supervisory control system implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   one or more computing devices configured to implement:
   one or more data input interfaces to a database configured to store electrochromic glass system data for an electrochromic glass system to be installed at a customer-site;
   a mapping engine configured to map, based on the electrochromic glass system data, controller identifiers of controllers to be installed at the customer-site to electrochromic glass units to be installed at the customer-site, wherein the electrochromic glass units are to be controlled by controllers having the respective controller identifiers;
   a project database export interface configured to export a current version of the database to be accessible by a supervisory control system at the customer-site, including a current mapping between the respective ones of the controllers to be installed at the customer-site and the respective ones of the electrochromic glass units to be installed at the customer-site;
   wherein the one or more data input interfaces are configured to:
   receive updated electrochromic glass system data for the electrochromic glass system; and
   automatically update the database to reflect the updated electrochromic glass system data;
   wherein the mapping engine is further configured to:
   automatically update the current mapping based on a current set of information stored in the database for the electrochromic glass system; and
   wherein the project database export interface is further configured to:
   export an updated current version of the database for use by the supervisory control system at the customer-site, the updated current version of the database comprising the updated electrochromic glass system data and the updated mappings.

2. The system of claim 1, wherein the updated electrochromic glass system data comprises design updates, received via the one or more data input interfaces, prior to installation of the electrochromic glass system at the customer-site.

3. The system of claim 1, wherein the updated electrochromic glass system data comprises updated information, received via a project database update interface of the one or more data input interfaces, indicating an as-built configuration of the electrochromic glass system at the customer-site.

4. The system of claim 3, wherein the as-built configuration of the electrochromic glass system at the customer site, received via the project database update interface, comprises a version of the database updated by the supervisory control system at the customer site.

5. The system of claim 4, wherein the project database update interface is configured to receive the version of the database updated by the supervisory control system via data stored on a portable device connected to the project database update interface.

6. The system of claim 4, wherein the project database update interface is configured to receive the version of the database updated by the supervisory control system via a secure network connection to the supervisory control system or via a secure connection with a cloud-based resource in communication with the supervisory control system.

7. The system of claim 1, wherein respective ones of the one or more data input interfaces to the database are implemented using browser-based windows for entering and manipulating the electrochromic glass system data.

8. The system of claim 7, wherein at least some of the browser-based windows implement a graphical interface allowing a designer to drag and drop electrochromic glass units on a replica of a facade to design a layout of the electrochromic glass units on the facade; and
   wherein the mapping engine is configured to automatically generate or update the mappings based on the layout of the electrochromic glass units entered via the graphical interface.

9. The system of claim 8, wherein the mapping engine is further configured to:
   automatically generate wiring diagrams for the electrochromic glass system based on the layout of the electrochromic glass units entered via the graphical interface.

10. The system of claim 1, wherein the one or more data input interfaces are configured to:

receive plan diagrams for one or more buildings or other facades at the customer-site; and convert the plan diagrams into facades usable by a graphical interface to design a layout of electrochromic glass units.

11. A system, comprising:

one or more computing devices configured to implement a supervisory control system for an electrochromic glass system installed, or to be installed, at a customer-site, the supervisory control system comprising:

a database import interface, configured to import a pre-populated database for the electrochromic glass system, wherein the pre-populated database comprises respective mappings between respective controllers of the electrochromic glass system and respective electrochromic glass units of the electrochromic glass system; and a controller configuration module configured to:
identify respective ones a plurality of controllers of the electrochromic glass system; and
automatically configure, at the customer-site, the respective ones of the installed controllers based on the respective characteristics of electrochromic glass units mapped to the respective controllers, wherein different ones of the electrochromic glass units have different characteristics.

12. The system of claim 11, wherein the supervisory control system further comprises:

a supervisory controller, configured to coordinate control of the respective controllers mapped to the respective electrochromic glass units, wherein one or more control algorithms for the supervisory controller are specified in the pre-populated data-based imported via the database import interface.

13. The system of claim 11, wherein:

the respective controllers of the electrochromic glass system are installed prior to being configured to control a particular electrochromic glass unit; and respective ones of the controllers each comprise a networking module configured to indicate, via a network connection with the supervisory control system, a respective controller identifier for the respective controller.

14. The system of claim 13, wherein:

to the networking modules of the respective controllers are configured to implement a dynamic host configuration protocol to advertise internet protocol addresses of the controllers to the supervisory control system over an Ethernet network; and the supervisory control system is configured to, for respective ones of the controllers, subsequent to identifying the respective controller, assign a static IP address to the respective controller for use in communicating with the supervisory control system over the Ethernet network.

15. The system of claim 11, wherein the supervisory control system is configured to:

receive updated electrochromic glass system data for the electrochromic glass system; and automatically update the database to reflect the updated electrochromic glass system data, wherein the updated electrochromic glass system data changes at least one of the mappings or changes at least one set of characteristics for at least one of the electrochromic glass units.

16. The system of claim 15, wherein the supervisory control system further comprises:

a project database export interface configured to export a current version of the database, including a current mapping between the respective ones of the controllers installed at the customer-site and the respective ones of the electrochromic glass units installed at the customer-site.

17. The system of claim 16, wherein the project database export interface is configured to:

export the current version of the database to a portable device connected to the data export interface; or export the current version of the database via a secure network connection to another supervisory control system at a remote site or via a secure connection with a cloud-based resource in communication with the other supervisory control system at the remote site.

18. A computer-readable medium storing program instructions, that when executed on or across the one or more processors, cause the one or more processors to:

discover controllers for electrochromic glass units connected to a network; and provide, to respective ones of the controllers, configuration parameters for particularly configuring the respective controllers to control respective electrochromic glass units to which the respective controllers are coupled, wherein the configuration parameters are provided based on respective mappings between controller identifiers for the respective controllers and characteristics of the electrochromic glass units that are stored in a project database accessible to the one or more processors.

19. The computer-readable medium of claim 18, wherein the program instructions cause the one or more processors to:

execute a discovery process to discover the controllers, wherein the controllers advertise dynamic internet protocol (IP) addresses during the discovery process;

assign static network addresses to the controllers that are discovered to be connected to the network via the discovery process; and store the static network address and associated controller identifiers in the project database for an electrochromic glass system comprising the controllers and the electrochromic glass units connected to the network.

20. The computer-readable medium of claim 18, wherein the program instructions cause the one or more processors to:

receive updated electrochromic glass system data for the electrochromic glass system;

automatically update one or more of the respective mappings; and export a current version of the project database for the electrochromic glass system, wherein the updated version of the project database comprises the updated electrochromic glass system data and the updated mappings.

* * * * *